(12) United States Patent
Yan et al.

(10) Patent No.: US 10,782,465 B2
(45) Date of Patent: Sep. 22, 2020

(54) LIGHT GUIDE PLATE WITH ARRAY OF STRUCTURES ON BOTH MAJOR SURFACES

(71) Applicants: BEIJING BOE CHATANI ELECTRONICS CO., LTD., Beijing (CN); BOE TECHNOLOGY GROUP CO., LTD., Beijing (CN)

(72) Inventors: Tao Yan, Beijing (CN); Qilin Li, Beijing (CN); Rong Chen, Beijing (CN)

(73) Assignees: Beijing BOE Chatani Electronics Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/460,080

(22) Filed: Jul. 2, 2019

(65) Prior Publication Data
US 2020/0166688 A1   May 28, 2020

(30) Foreign Application Priority Data
Nov. 23, 2018   (CN) .......................... 2018 1 1405676

(51) Int. Cl.
*G02B 6/10*   (2006.01)
*F21V 8/00*   (2006.01)
(52) U.S. Cl.
CPC ........... *G02B 6/005* (2013.01); *G02B 6/0065* (2013.01)

(58) Field of Classification Search
CPC .. G02B 6/0036; G02B 6/0043; G02B 6/0011; G02B 6/0033; G02B 6/0035; G02B 6/0038; G02B 6/004; G02B 6/0051; G02B 6/0053
See application file for complete search history.

(56) References Cited

U.S. PATENT DOCUMENTS

| 3,566,102 A * | 2/1971 | Choyke, Jr. ............... F21V 5/00 362/317 |
| 5,598,280 A * | 1/1997 | Nishio ....................... F21V 5/04 349/57 |
| 5,764,315 A * | 6/1998 | Yokota ................. G02B 6/0053 349/62 |
| 6,870,674 B2 * | 3/2005 | Ookawa ................. G02B 5/045 359/454 |

(Continued)

FOREIGN PATENT DOCUMENTS

CN     104712958 A     6/2015

OTHER PUBLICATIONS

First Office Action for Chinese Application No. 201811405676.3, dated Nov. 6, 2019, 6 Pages.

*Primary Examiner* — Ismael Negron
(74) *Attorney, Agent, or Firm* — Brooks Kushman P.C.

(57) ABSTRACT

A light guide plate having a main body with a first surface and a second surface opposite the first surface; a first transparent material layer arranged on the first surface and having a plurality of portions recessed towards the first surface, and a second transparent material layer arranged on the second surface and having a plurality of ribbed structures, the difference between the refractive indexes of both of the first and second transparent layers, and the refractive index of the main body, being less than a desired threshold.

17 Claims, 2 Drawing Sheets

(56) References Cited

U.S. PATENT DOCUMENTS

| | | | |
|---|---|---|---|
| 6,925,243 B2* | 8/2005 | Lin | G02B 6/0038 |
| | | | 362/339 |
| 7,232,250 B2* | 6/2007 | Chuang | G02B 5/045 |
| | | | 362/339 |
| 7,391,571 B2* | 6/2008 | Lee | G02B 5/0221 |
| | | | 359/599 |
| 7,628,514 B2* | 12/2009 | Hsu | G02B 5/0236 |
| | | | 362/330 |
| 7,645,058 B2* | 1/2010 | Kurokawa | B32B 3/30 |
| | | | 362/330 |
| 7,789,538 B2* | 9/2010 | Epstein | G02F 1/133606 |
| | | | 362/244 |
| 8,169,707 B2* | 5/2012 | Nakamura | G02B 1/04 |
| | | | 359/454 |
| 8,177,377 B2* | 5/2012 | Chang | G02B 5/02 |
| | | | 359/625 |
| 9,140,831 B2* | 9/2015 | Kuroda | G02B 5/0231 |
| 2004/0114347 A1 | 6/2004 | Leu et al. | |
| 2014/0055717 A1 | 2/2014 | Benson et al. | |
| 2018/0113249 A1 | 4/2018 | Tiberi | |

* cited by examiner

LIGHT GUIDE PLATE WITH ARRAY OF STRUCTURES ON BOTH MAJOR SURFACES

CROSS-REFERENCE TO RELATED APPLICATION

This application claims priority to Chinese Patent Application No. 201811405676.3 filed on Nov. 23, 2018, which is incorporated herein by reference in its entirety.

TECHNICAL FIELD

The present disclosure relates to the field of display technologies, and in particular to a light guide plate and a manufacturing method thereof, a backlight module, and a display panel.

BACKGROUND

With development of display technologies, a light guide plate of a display panel is gradually made of glass material, and a main body of the light guide plate has stronger hardness and thinner thickness. Ink is used to print light guide points on a main body of the light guide plate in the related art. Chemical properties of the ink and the main body of the light guide plate are different, and errors are easily generated. In addition, adhesion of the ink on the main body is poor, and the ink is easily detached from the main body.

It can be seen that the light guide plate in the related art has a technical problem that color difference can be easily produced and the ink can be easily detached from the main body.

SUMMARY

The embodiments of the present disclosure provide a light guide plate, a manufacturing method thereof, a backlight module, and a display panel.

In order to achieve the above object, specific solutions provided by the embodiments of the present disclosure are as follows:

In a first aspect, a light guide plate is provided by an embodiment of the present disclosure, including: a main body including a first surface; a first transparent material layer arranged on the first surface, wherein a difference between a refractive index of the first transparent material layer and a refractive index of the main body is less than a threshold, and a side of the first transparent material layer distal to the first surface is recessed towards the first surface to form a plurality of recessed portions in the first transparent material layer.

Optionally, the light guide plate further includes: a second transparent material layer arranged on the second surface, a difference between a refractive index of the second transparent material layer and the refractive index of the main body is less than a threshold, and a plurality of ribbed structures are formed in the second transparent material layer and arranged in an array.

Optionally at least one of the first transparent material layer and the second transparent material layer is made of UltraViolet (UV) adhesive.

Optionally, the UV adhesive includes acrylate or epoxy resin.

Optionally the main body is made of light-transmissible glass; and the main body has a thickness ranging from 1 mm to 1.5 mm.

Optionally, at least one of the first transparent material layer and the second transparent material layer has a thickness ranging from 0.02 mm to 0.05 mm.

Optionally, the plurality of recessed portions are arranged in an array in the side of the first transparent material layer distal to the first surface.

In a second aspect, an embodiment of the present disclosure further provides a backlight module, including the light guide plate according to any one of the first aspects.

In a third aspect, an embodiment of the present disclosure further provides a display panel, including the backlight module according to the second aspect.

In a fourth aspect, an embodiment of the present disclosure further provides a method for manufacturing the light guide plate according to any one of the first aspect, wherein the method includes: providing the main body, wherein the main body includes the first suffice; forming the first transparent material layer on the first surface, wherein the difference between the refractive index of the first transparent material layer and the refractive index of the main body is less than the threshold; recessing, through a hot pressing process, the side of the first transparent material layer distal to the first surface towards the first surface, to form the plurality of recessed portions in the first transparent material layer.

Optionally, the main body farther includes a second surface arranged opposite to the first surface; the method further includes: forming a second transparent material layer on the second surface, wherein a difference between the refractive index of the second transparent material layer and the refractive index of the main body is less than a second threshold; forming, through the hot pressing process, the plurality of ribbed structures in the second transparent material layer, wherein the plurality of ribbed structures are arranged in an array.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
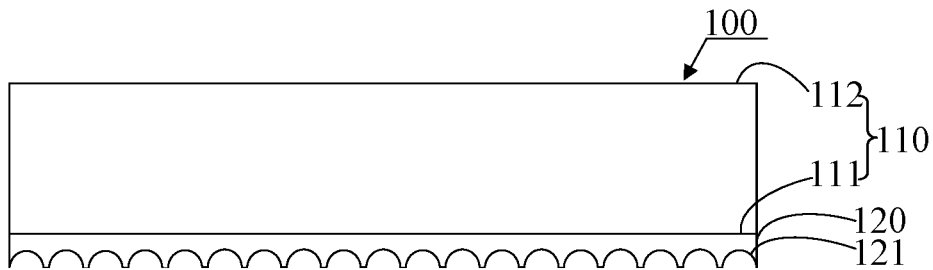
FIG. 1 is a schematic structural diagram of a light guide plate according to an embodiment of the present disclosure.

FIG. 1 is a schematic structural diagram of a light guide plate according to an embodiment of the present disclosure. As shown in FIG. 1, the light guide plate 100 includes: a main body 110 including a first surface 111 and a second surface 112 arranged opposite to each other; a first transparent material layer 120 arranged on the first surface 111, wherein a difference between a refractive index of the first transparent material layer 120 and a refractive index of the main body 110 is less than a preset threshold, and a side of the first transparent material layer 120 distal to the first surface 110 is recessed towards the first surface 110 to form a plurality of recessed portions 121 in the first transparent material layer 120. A shape of the recessed portion 121 may be hemispherical, semi-ellipsoidal, other arc shape, conical, etc., and the present disclosure does not specifically limit the shape, size, and distribution of the recessed portions 121, as long as light incident on the first transparent material layer 120 may be reflected and diffused at various angles to enable the light guide plate 100 to emit light as uniformly as possible. In an embodiment, the recessed portions 121 may be arranged in an array.

In the light guide plate 100 provided by an embodiment of the present disclosure, two surfaces of the main body 110 are the first surface 111 and the second surface 112, respectively, and the first surface 111 and the second surface 112 are arranged opposite to each other. The main body 110 is made of transparent light guide material to ensure a basic light guide function of the main body 110. The main body 110 can be made of a material that is hard and can be made into an ultra-thin structure.

In an implementation, the main body 110 can be made of light-transmissible glass, and the main body 110 has a thickness ranging from 1 mm to 1.5 mm.

The main body 110 is made of light-transmissible glass and has a thickness ranging from 1 mm to 1.5 mm, optionally 1.1 mm, which ensures a higher strength of the light guide plate 100 while reducing thickness of the light guide plate 100.

In addition, the light guide plate 100 further includes the first transparent material layer 120, and the difference between the refractive index of the first transparent material layer 120 and the refractive index of the main body 110 is less than the preset threshold, to ensure that the first transparent material layer 120 does not adversely affect proper operation of the main body 110. It should be noted that the difference between the refractive index of the first transparent material layer 120 and the refractive index of the main body 110 being less than the preset threshold indicates that the first transparent material layer 120 may have exactly the same refractive index as the main body 110, or the difference of the refractive indexes between the first transparent material layer 120 and the refractive index of the main body 110 is selected to be within the preset threshold. For example, the preset threshold may be 0.4. The refractive index of the first transparent material layer 120 is in a range from 1.53 to 1.56 when the first transparent material layer 120 is made of UV adhesive, and the refractive index of the main body 110 is in a range from 1.8 to 1.9 when the main body 110 is made of light-transmissible glass, and the difference of the refractive indexes between the first transparent material layer 120 and the refractive index of the main body 110 is in a ranges from 0.24 to 0.37, which is in the range of the threshold.

The first transparent material layer 120 is processed through a hot pressing process, and the plurality of recessed portions 121 are formed on the first transparent material layer, arranged in an array and used as light guide points.

Figure 4:
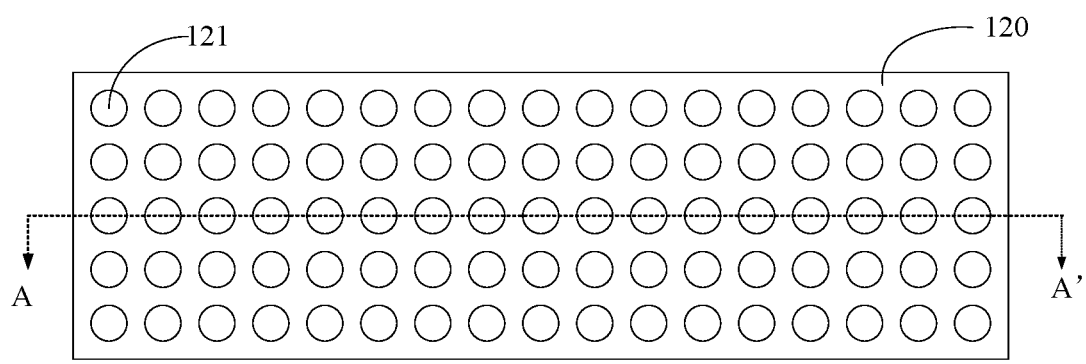
FIG. 4 is a bottom view of the light guide plate shown in FIG. 1.

FIG. 1 may be a cross-sectional view of the light guide plate 100 along a line AA' as shown in FIG. 4.

Light is transmitted to various light guide points of the light guide plate 100, and reflected light will diffuse at various angles. As a result, total reflection condition is not satisfied and the reflected light is emitted from the light guide plate. The size, density, and the like of each of the recessed portions 121 arranged in an array on the light guide plate 100 may be the same or different. Based on position of light source and the like, the light guide plate 100 uniformly emits light by arranging various light guide points of different densities and sizes on the light guide plate 100.

In the light guide plate provided by an embodiment of the present disclosure, the first transparent material layer is formed on the first surface of the main body, and the difference between the refractive index of the first transparent material layer and the refractive index of the main body is less than the preset threshold, and then the plurality of recessed portions are formed in the first transparent material layer and arranged in an array, to enable the light guide plate to reflect light uniformly. The first transparent material layer is arranged on the main body, and has no color difference as compared with the main body, which optimizes the light guide effect, and the first transparent material layer is relatively stable and prevented from detaching from the main body. As compared with a solution of forming dots directly on the main body made of glass material in the related art, it effectively prevents cracking of the light guide plate and effectively prevents a proper operation of the light guide plate from being adversely affected.

Figure 2:
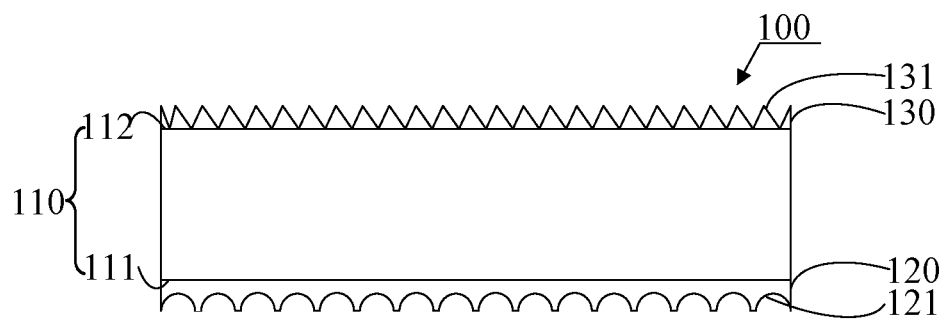
FIG. 2 is a schematic structural diagram of another light guide plate according to an embodiment of the present disclosure.

On the basis of the above embodiments, as shown in FIG. 2, the light guide plate 100 may further include: a second transparent material layer 130 arranged on the second surface 112, a difference between a refractive index of the second transparent material layer 130 and the refractive index of the main body 110 is less than a preset threshold, and a plurality of ribbed structures 131 are formed in the second transparent material layer 130 and arranged in an array.

In the implementation, the second transparent material layer 130 is arranged on the second surface 112 of the main body 110, and the difference between the refractive index of the second transparent material layer 130 and the refractive index of the main body 110 is less than the preset threshold. Optionally, the second transparent material layer 130 and the first transparent material layer 120 may be made of the same material, for example, the UV adhesive.

Figure 5:
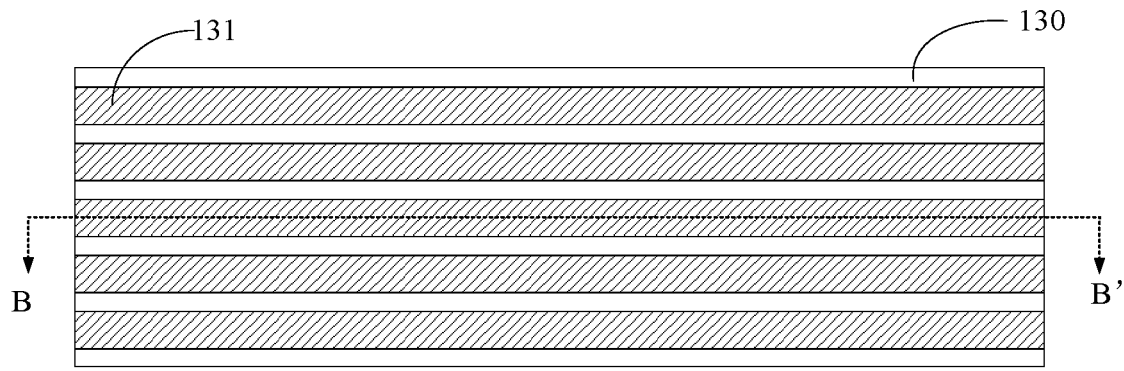
FIG. 5 is a top view of the light guide plate shown in FIG. 2.

FIG. 2 may be a cross-sectional view of the light guide plate 100 along a line BB' as shown in FIG. 5.

The plurality of ribbed structures 131 are formed in the second transparent material layer 130 and arranged in an array, and the ribbed structures 131 may be a Lenti microstructure. The Lenti microstructure may be formed on the second surface 112 of the main body 110, which can reduce residual image, improve diffusion effect, optimize optical image, enhance defect-shielding effect, and improve brightness uniformity. The usage of diffusion film is reduced while a relatively good diffusion effect is achieved. It does not need to enlarge the size of light spots, and is suitable for light and thin light guide plate 100, which reduces weight and thickness of the product, and improves cost performance of the product.

In addition, it is also possible to achieve light constraints required for backlight by adjusting depth-width ratio of the Lenti structure, and adjusting the depth-width ratio of the Lenti structure can be achieved by adjusting thickness of the second transparent material layer 130.

In an implementation, the first transparent material layer 120 and/or the second transparent material layer 130 may be made of the UV adhesive, The UV adhesive, also known as photosensitive adhesive, shadowless adhesive, UV curable adhesive, etc., is a kind of adhesive that can be cured by ultraviolet irradiation. The photosensitive adhesive curing is that photosensitizer in UV curable material absorbs ultraviolet light under ultraviolet irradiation and then generates active radicals or cations, which causes monomer polymerization and cross-linking chemical reaction, and enables adhesive to be converted from being in a liquid state to be in a solid state in a few seconds. Optionally, the first transparent material layer 120 and/or the second transparent material layer 130 have a thickness ranging from 0.02 mm to 0.05 mm.

The first surface 111 of the main body 110 is coated with the UV adhesive to form the first transparent material layer 120, and the second surface 112 is coated with the UV adhesive to form the second transparent material layer 130, and then the first transparent material layer 120 is processed to form the recessed portion 121 through the hot pressing process, and the second transparent material layer 130 is processed to form the Lend microstructure, such that manufacturing of the light guide plate 100 is completed.

Specifically, the UV adhesive may include an acrylate or an epoxy resin, the acrylate can withstand a high temperature of 120 degrees Centigrade, and the epoxy resin can withstand a high temperature of 200 degrees Centigrade.

The first transparent material layer 120 and the second transparent material layer 130 are made of the UV adhesive, the refractive index of the first transparent material layer 120 and the second transparent material layer 130 is similar to the refractive index of the main body 110, and can be stably attached to the main body 110 and is not easy to fall off, and the recessed portion 121 or the ribbed structure 131 can be processed through a high temperature hot pressing process, thereby further optimizing performance of the light guide plate 100. At the same time, the photosensitive adhesive has advantages such as a surface fast curing rate, low shrinkage rate, Volatile Organic Compound (VOC) free, environment friendly, being waterproof; long service life, and yellowing resistance, etc., thereby further optimizing the performance of the light guide plate 100.

An embodiment of the present disclosure further provides a backlight module including the light guide plate 100 provided by the embodiments shown in FIG. 1 and FIG. 2 as mentioned above.

In the backlight module provided by an embodiment of the present disclosure, improvements have been made to the light guide plate, and the first transparent material layer is formed on the first surface of the main body of the light guide plate, and the difference between the refractive index of the first transparent material and the refractive index of the main body is less than the preset threshold, and then the plurality of recessed portions are formed in the first transparent material layer and arranged in an array; to enable the light guide plate to reflect light uniformly. The first transparent material layer is arranged on the main body, and has no color difference as compared with the main body, which optimizes the light guide effect, and the first transparent material layer is relatively stable and prevented from detaching from the main body. For a specific implementation process of the backlight module provided by an embodiment of the present disclosure, it may refer to a specific implementation process of the light guide plate provided by the above embodiments, and details thereof are not described herein again.

An embodiment of the present disclosure farther provides a display panel including the backlight module provided in the above embodiments.

In the display panel provided by an embodiment of the present disclosure, improvements have been made to the light guide plate included in the backlight module, and the first transparent material layer is formed on the first surface of the main body of the light guide plate, and the difference between the refractive index of the first transparent material layer and the refractive index of the main body is less than the preset threshold, and then the plurality of recessed portions are formed in the first transparent material layer and arranged in an array, to enable the light guide plate to reflect light uniformly. The first transparent material layer is arranged on the main body; and has no color difference as compared with the main body, which optimizes the light guide effect, and the first transparent material layer is relatively stable and prevented from detaching from the main body. For a specific implementation process of the display panel provided by an embodiment of the present disclosure, it may refer to a specific implementation process of the light guide plate and the backlight module provided by the above embodiments, and details thereof are not described herein again.

Figure 3:
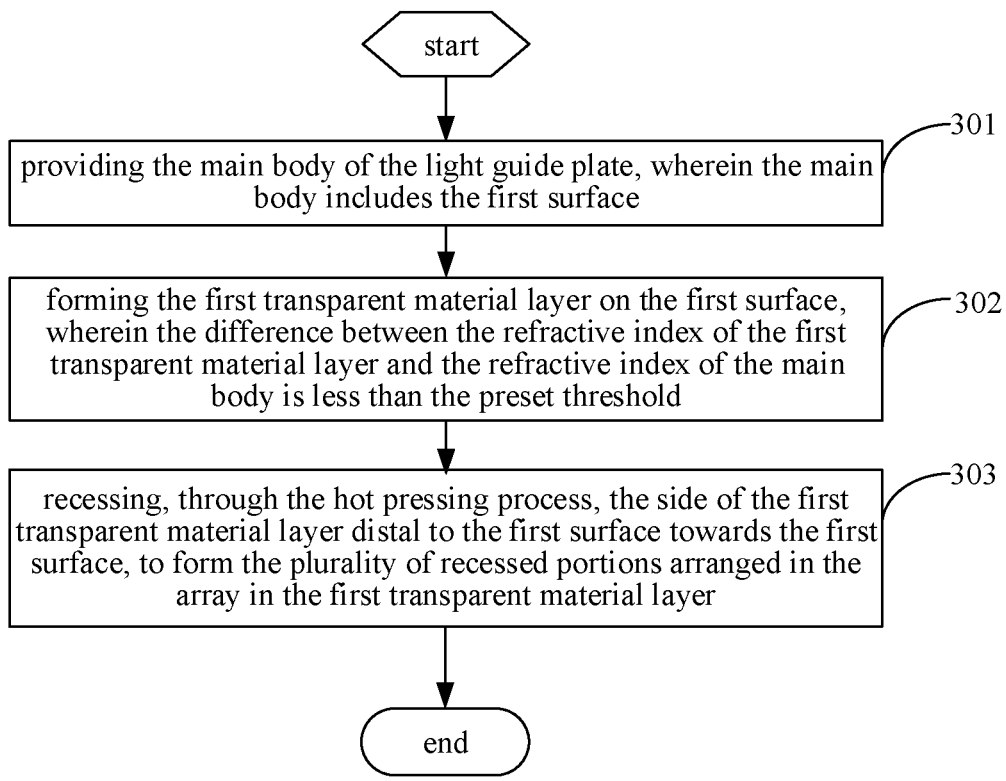
FIG. 3 is a schematic structural diagram of a method for manufacturing the light guide plate according to an embodiment of the present disclosure.

Referring to FIG. 3, an embodiment of the present disclosure further provides a method for manufacturing the light guide plate according to the embodiments shown in FIG. 1 and FIG. 2 as mentioned above. As shown in FIG. 3, the method includes: Step 301, providing the main body of the light guide plate, wherein the main body includes the first surface; Step 302, forming the first transparent material layer on the first surface, wherein the difference between the refractive index of the first transparent material layer and the refractive index of the main body is less than the preset threshold; Step 303, recessing, through the hot pressing process, the side of the first transparent material layer distal to the first surface towards the first surface, to form the plurality of recessed portions arranged in the array in the first transparent material layer.

In this embodiment, the first transparent material layer is formed on the first surface of the main body of the light guide plate, and a material of the first transparent material layer is selected, such that the difference between a refractive index of the first transparent material layer and the refractive index of the main body is within a preset range. The plurality of recessed portions are formed on the first transparent material layer and arranged in an array through the hot pressing process, and are form at one time through roll extrusion, so as to complete manufacturing of the light guide plate.

Further, the main body of the light guide plate may further include a second surface arranged opposite to the first surface; the method further includes: forming the second transparent material layer on the second surface, wherein the difference between the refractive index of the second transparent material layer and the refractive index of the main body is less than the preset threshold; and forming, through the hot pressing process, the plurality of ribbed structures in the second transparent material layer, wherein the plurality of ribbed structures are arranged in an array.

The main body includes the first surface and the second surface arranged opposite to each other. Based on the above steps, the first transparent material layer is formed on the first surface, and then the plurality of recessed portions arranged in an array are formed, and the second transparent material layer is formed on the second surface, and then the plurality of ribbed structures arranged in an array are formed. The first transparent material layer and the second transparent material layer may be made of the same material, for example, the UV adhesive.

In the display panel provided by an embodiment of the present disclosure, improvements have been made to the light guide plate included in the backlight module, and the first transparent material layer is formed on the first surface of the main body of the light guide plate, and the difference between the refractive index of the first transparent material layer and the refractive index of the main body is less than the preset threshold, and then the plurality a recessed portions are formed in the first transparent material layer and arranged in an array, to enable the light guide plate to reflect light uniformly. The first transparent material layer is arranged on the main body, and has no color difference as compared with the main body, which optimizes the light guide effect, and the first transparent material layer is relatively stable aid prevented from detaching from the main body. The ribbed structure is formed on the second surface of the main body, which can reduce residual image, improve diffusion effect, optimize optical image, enhance defect-shielding effect, and improve brightness uniformity. For a specific implementation process of the method for manufacturing the light guide plate provided by an embodiment of the present disclosure, it may refer to a specific implementation process of the light guide plate and the backlight module provided by the above embodiments, and details thereof are not described herein again.

The above description is only specific embodiments of the present disclosure, but the protection scope of the present disclosure is not limited thereto, and any person skilled in the art can easily think of changes or replacements within the technical scope disclosed by the present disclosure, and these changes or replacements should be considered as falling into the protection scope of the present disclosure. Therefore, the protection scope of the present disclosure should be determined by the protection scope of the claims.

What is claimed is:

1. A light guide plate comprising:
   a main body comprising a first surface;
   a first transparent material layer arranged on the first surface, wherein a difference between a refractive index of the first transparent material layer and a refractive index of the main body is greater than 0 and less than a threshold of 0.4, and a side of the first transparent material layer distal to the first surface is recessed towards the first surface to form a plurality of recessed portions in only the first transparent material layer, and the recessed portions are physically separated from the main body by the first transparent material layer,
   wherein the main body further comprises a second surface arranged opposite to the first surface, and the light guide plate further comprises:
   a second transparent material layer arranged on the second surface, a difference between a refractive index of the second transparent material layer and the refractive index of the main body is greater than 0 and less than the threshold of 0.4, and a plurality of ribbed structures are formed in only the second transparent material layer and arranged in an array.

2. The light guide plate according to claim 1, wherein the plurality of recessed portions are arranged in an array in the side of the first transparent material layer distal to the first surface.

3. The light guide plate according to claim 1, wherein at least one of the first transparent material layer and the second transparent material layer is made of UltraViolet (UV) adhesive.

4. The light guide plate according to claim 3, wherein the UV adhesive comprises acrylate or epoxy resin.

5. The light guide plate according to claim 1, wherein the main body is made of light-transmissible glass; and
   the main body has a thickness ranging from 1 mm to 1.5 mm.

6. The light guide plate according to claim 5, wherein at least one of the first transparent material layer and the second transparent material layer has a thickness ranging from 0.02 mm to 0.05 mm.

7. A method for manufacturing the light guide plate according to claim 1, wherein the method comprises:
   providing the main body, wherein the main body comprises the first surface;
   forming the first transparent material layer on the first surface, wherein the difference between the refractive index of the first transparent material layer and the refractive index of the main body is greater than 0 less than the threshold of 0.4;
   recessing, through a hot pressing process, the side of the first transparent material layer distal to the first surface towards the first surface, to form the plurality of recessed portions in only the first transparent material layer.

8. The method according to claim 7, further comprising:
   forming the second transparent material layer on the second surface, wherein a difference between the refractive index of the second transparent material layer and the refractive index of the main body is greater than 0 less than the threshold of 0.4; and
   forming, through the hot pressing process, the plurality of ribbed structures in only the second transparent material layer, wherein the plurality of ribbed structures are arranged in the array.

9. The method according to claim 7, wherein the plurality of recessed portions are arranged in an array in the side of the first transparent material layer distal to the first surface.

10. A backlight module comprising the light guide plate according to claim 1.

11. The backlight module according to claim 10, wherein the plurality of recessed portions are arranged in an array in the side of the first transparent material layer distal to the first surface.

12. The backlight module according to claim 10, wherein at least one of the first transparent material layer and the second transparent material layer is made of UV adhesive.

13. The backlight module according to claim 12, wherein the UV adhesive comprises an acrylate or an epoxy resin.

14. The backlight module according to claim 10, wherein the main body is made of light-transmissible glass; and
    the main body has a thickness ranging from 1 mm to 1.5 mm.

15. The backlight module according to claim 14, wherein at least one of the first transparent material layer and the second transparent material layer has a thickness ranging from 0.02 mm to 0.05 mm.

16. A display panel comprising the backlight module according to claim 10.

17. The display panel according to claim 16, wherein at least one of the first transparent material layer and the second transparent material layer is made of UV adhesive.

* * * * *